H. WILSON.
DRIER.
APPLICATION FILED OCT. 21, 1912.
1,087,478.
Patented Feb. 17, 1914.
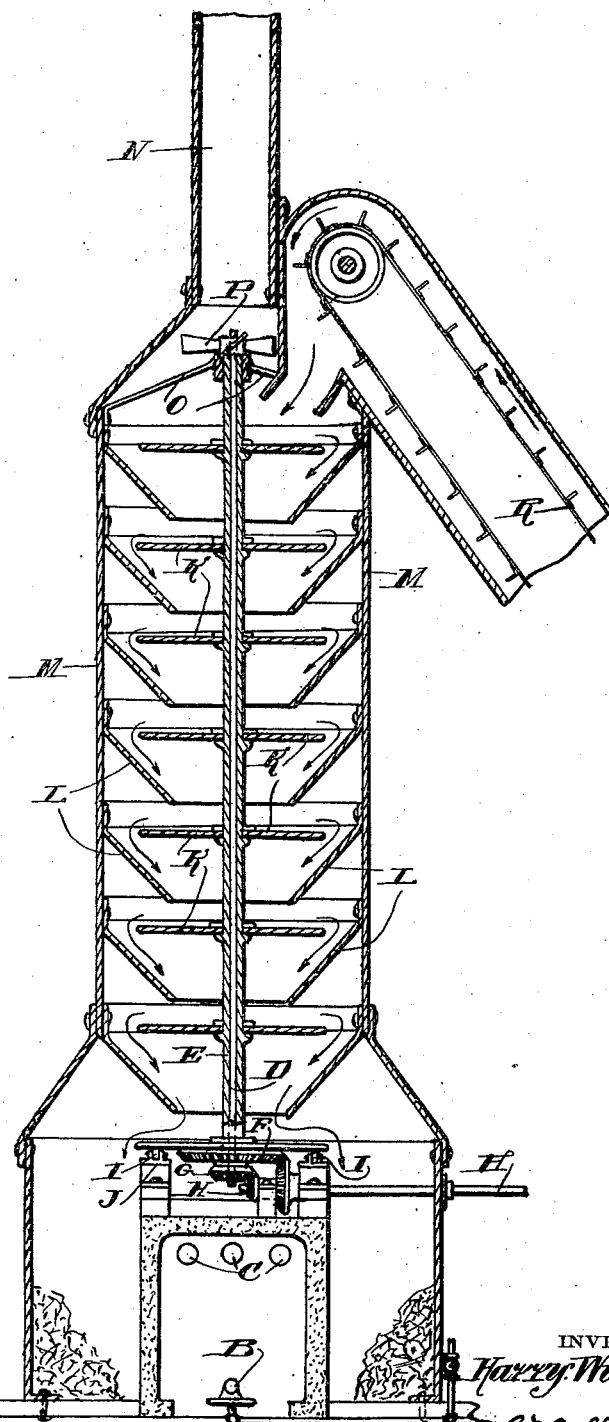
WITNESSES
INVENTOR
Harry Wilson
BY G. H. Strong
ATTORNEY

UNITED STATES PATENT OFFICE.

HARRY WILSON, OF SAN FRANCISCO, CALIFORNIA, ASSIGNOR TO PACIFIC KELP CO., OF SAN FRANCISCO, CALIFORNIA, A CORPORATION OF CALIFORNIA.

DRIER.

1,087,478.  Specification of Letters Patent.  Patented Feb. 17, 1914.

Application filed October 21, 1912. Serial No. 726,887.

*To all whom it may concern:*

Be it known that I, HARRY WILSON, a subject of the King of England, residing in the city and county of San Francisco and State of California, have invented new and useful Improvements in Driers, of which the following is a specification.

This invention relates to a mechanical device for the purpose of evaporating moisture from any organic matter in which the animal organisms are very active and the chemical properties such that disintegration commences immediately upon exposure to the air.

The present apparatus is designed for drying kelp. Kelp left in the open air for 48 hours will lose 50% of its weight, but in so doing will also lose 20% of its value, as immediately on exposure to the air it exudes moisture from every pore and cell and this moisture is a saturated solution of potassium chlorid. Therefore an economical drier must preserve all of the original moisture the kelp contained when first taken from the water. Kelp dried in the open air has effloresced and lost 20% of the potassium chlorid that it first contained, therefore, a practical drier must complete its work within a closed compartment where all of the dripping moisture and effloresced salts are recovered. When kelp is dried in a closed compartment on stationary pans or trays with the temperature below 100° C. the vegetable cells break down and the animal organisms become immediately active, causing a continual leakage of valuable matter and a waste of heat and time to complete the process. Therefore, a successful drier using a heat of 100° C. must keep the kelp in constant motion to prevent the vegetable cells from breaking down and the animal organisms from becoming active. When kelp is dried in a closed compartment when the temperature exceeds 100° C. all of the 40% free iodin, all of the acetone, acetic acid and alcohol will vaporize and pass off. Therefore, the drier must work at a temperature less than 100° C. to be economical and efficient. The drier which I have constructed covers all of these points and will give 30% more efficiency than any known process at the present time.

The drawing is a vertical section representing the invention.

A, shaft connected to motive power; B, gravity distillate burner; C, heat conduits; D, inner shaft connecting motive power with exhaust fan; E, outer shaft sustaining centrifugal disks; F, bevel gear or friction connecting outer shaft with motive power; G, bevel gear or friction connecting inner shaft with motive power; H, bevel gear or friction connecting motive power with inner shaft; I, ball bearing rollers sustaining weight of inner shaft and centrifugal disks; J, iron revolving plane connecting with rollers I and supporting outer shaft and centrifugal disks; K, centrifugal disks and tables upon which material lodges alternately; L, annular disks guiding material toward the center after being discharged by centrifugal disks K; M, outer shell constructed in suitable segments; N, discharge pipe, properly screened to prevent the discharge of any light material passing above the fan "P"; O, lateral braces to sustain shafts "E" and "D" in a perpendicular position; P, exhaust fan or aspirator propelled by shaft "D" for creating a draft through the apparatus in opposite direction to the travel of the drying material; R, a proper elevator for the material to be handled.

The arrows indicate the progress of the material from the elevator to its final discharge.

The bevel gear or frictions used to propel the shafts shall be in such proportion as different materials may require, and the speed with which these shafts are operated will determine the volume of material which can be evaporated. This evaporator is especially designed to evaporate to dryness the ocean kelps or sea-weeds in which the animal organisms are so active and the chemical composition of such a nature that disintegration commences immediately upon their exposure to the air and also the necessity of an evaporator where the effloresced salts may be held in a closed compartment.

Having thus described my invention, what I claim and desire to secure by Letters Patent is—

A device of the class described comprising an outer shell, a plurality of stationary hoppers arranged in series one above the other within said shell, a draft pipe at the upper end of said shell, a hollow vertical shaft within said shell, a plurality of flat disks arranged in series one above the other on said hollow shaft, gearing for rotating said hollow shaft, an inner shaft mounted within said hollow shaft, a fan carried on the upper end of said inner shaft and above said flat disks to create an upward current of air through said shell when said fan is operated, and gearing located beneath said disks for rotating said inner shaft to operate said fan.

In testimony whereof I have hereunto set my hand in the presence of two subscribing witnesses.

HARRY WILSON.

Witnesses:
JOHN H. HERRING,
EMMA B. BRU.